US010385166B2

(12) United States Patent
Kwon et al.

(10) Patent No.: US 10,385,166 B2
(45) Date of Patent: Aug. 20, 2019

(54) POLYAMIDE RESIN, POLYAMIDE RESIN COMPOSITION CONTAINING SAME, PREPARATION METHOD THEREFOR, AND MOLDED PRODUCT INCLUDING SAME

(71) Applicant: LOTTE ADVANCED MATERIALS CO., LTD., Yeosu-si (KR)

(72) Inventors: So Young Kwon, Uiwang-si (KR); Joon Sung Kim, Uiwang-si (KR); Jin Kyu Kim, Uiwang-si (KR); Sang Kyun Im, Uiwang-si (KR); Il Kyoung Kwon, Uiwang-si (KR); Ki Chul Son, Uiwang-si (KR); Young Sub Jin, Uiwang-si (KR); Sung Chul Choi, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 70 days.

(21) Appl. No.: 15/547,856

(22) PCT Filed: Apr. 8, 2016

(86) PCT No.: PCT/KR2016/003702
§ 371 (c)(1),
(2) Date: Aug. 1, 2017

(87) PCT Pub. No.: WO2016/175475
PCT Pub. Date: Nov. 3, 2016

(65) Prior Publication Data
US 2018/0016394 A1 Jan. 18, 2018

(30) Foreign Application Priority Data
Apr. 29, 2015 (KR) .................. 10-2015-0060932

(51) Int. Cl.
| C08J 5/04 | (2006.01) |
|---|---|
| C08K 3/00 | (2018.01) |
| C08K 5/00 | (2006.01) |
| C08K 7/14 | (2006.01) |
| C08G 69/26 | (2006.01) |
| C08G 73/02 | (2006.01) |
| C08L 77/06 | (2006.01) |
| C08L 79/02 | (2006.01) |

(52) U.S. Cl.
CPC ........... *C08G 69/26* (2013.01); *C08G 69/265* (2013.01); *C08G 73/028* (2013.01); *C08J 5/043* (2013.01); *C08K 3/00* (2013.01); *C08K 5/00* (2013.01); *C08L 77/06* (2013.01); *C08J 2367/02* (2013.01)

(58) Field of Classification Search
CPC ... C08L 77/06; C08L 2205/025; C08G 69/26; C08G 69/265
See application file for complete search history.

(56) References Cited

U.S. PATENT DOCUMENTS

| 5,352,499 | A | * | 10/1994 | Willard | .................. | B32B 27/08 |
|---|---|---|---|---|---|---|
| | | | | | | 428/35.7 |
| 6,943,231 | B2 | | 9/2005 | Buhler | | |
| 9,359,476 | B2 | | 6/2016 | Kwon et al. | | |
| 2009/0264588 | A1 | * | 10/2009 | Guaita | .................. | C08G 69/26 |
| | | | | | | 524/607 |
| 2013/0018166 | A1 | | 1/2013 | Nakai et al. | | |
| 2014/0212363 | A1 | | 7/2014 | Harman et al. | | |
| 2014/0235798 | A1 | * | 8/2014 | Kukalyekar | ........... | C08G 69/28 |
| | | | | | | 525/435 |
| 2015/0148518 | A1 | | 5/2015 | Kukalyekar et al. | | |
| 2016/0108174 | A1 | | 4/2016 | Jeol et al. | | |
| 2016/0289448 | A1 | * | 10/2016 | Jeol | ........ | C08G 69/26 |

FOREIGN PATENT DOCUMENTS

| CN | 104497304 A | 4/2015 |
|---|---|---|
| GB | 1226944 A | 3/1971 |
| JP | S32-6148 B1 | 8/1957 |
| KR | 10-2003-0094118 A | 12/2003 |
| KR | 10-2013-0050275 A | 5/2013 |
| KR | 10-1369149 B1 | 3/2014 |
| KR | 10-2014-0072080 A | 6/2014 |
| KR | 10-2014-0086770 A | 7/2014 |
| WO | 2013/004548 A1 | 1/2013 |
| WO | 2014/191303 A1 | 12/2014 |
| WO | 2016/175475 A1 | 11/2016 |

OTHER PUBLICATIONS

International Search Report in counterpart International Application No. PCT/KR2016/003702 dated Jul. 15, 2016, pp. 1-4.
Office Action in counterpart Korean Application No. 10-2015-0060932 dated May 25, 2017, pp. 1-6.
Extended Search Report in counterpart European Application No. 16786661.5 dated Nov. 30, 2018, pp. 1-7.

* cited by examiner

*Primary Examiner* — Brieann R Johnston
(74) *Attorney, Agent, or Firm* — Additon, Higgins & Pendleton, P.A.

(57) ABSTRACT

The polyamide resin of the present invention is a polymer of a monomer mixture including a dicarboxylic acid and an amine-based compound, wherein the amine-based compound comprises diamine and triamine and a branching rate measured using $^1$H-NMR is approximately 1% to approximately 8%.

10 Claims, No Drawings

POLYAMIDE RESIN, POLYAMIDE RESIN COMPOSITION CONTAINING SAME, PREPARATION METHOD THEREFOR, AND MOLDED PRODUCT INCLUDING SAME

CROSS-REFERENCE TO RELATED APPLICATIONS

This application claims priority to and the benefit of International Application No. PCT/KR2016/003702, filed Apr. 8, 2016, which published as WO 2016/175475 on Nov. 3, 2016; and Korean Patent Application No. 10-2015-0060932, filed in the Korean Intellectual Property Office on Apr. 29, 2015, the entire disclosure of each of which is incorporated herein by reference.

TECHNICAL FIELD

The present invention relates to a polyamide resin, a polyamide resin composition including the same, a method of preparing the same, and a molded product including the same.

BACKGROUND ART

Polyamide resins are broadly used in various fields including automobile components, electric and electronic products, machinery components, and the like. Polyamide resins are required to have various properties. Recently, various attempts have been made to improve thermal resistance, mechanical properties, moldability and absorptivity of the polyamide resins. Particularly, an acrylic impact modifier is added to the polyamide resin in order to improve impact resistance of the polyamide resin. Despite good impact reinforcement effects, the acrylic impact modifier is likely to decompose at a high processing temperature of highly thermal resistant nylon to generate an injection gas and can deteriorate long-term thermal stability of products due to a difference in thermal resistance between the acrylic impact modifier and the nylon even when used in a small amount. Therefore, there is a need for development of a polyamide resin that exhibits good impact reinforcement effects without deterioration in thermal resistance.

One example of the related art is disclosed in Japanese Patent No. S32-6148.

DISCLOSURE

Technical Problem

It is one object of the present invention to provide a polyamide resin having good impact resistance and high thermal resistance, a polyamide resin composition including the same, a method of preparing the same, and a molded product including the same.

It is another object of the present invention to provide a polyamide resin providing an extinction effect ideal for use in an exterior material, a polyamide resin composition including the same, a method of preparing the same, and a molded product including the same.

The above and other objects of the present invention can be achieved by the present invention described below.

Technical Solution

One aspect of the present invention relates to a polyamide resin.

In one embodiment, the polyamide resin is a polymer of a monomer mixture including a dicarboxylic acid and an amine compound, wherein the amine compound includes a diamine and a triamine and has a branch rate of about 1% to about 8%, as measured using 1H-NMR.

In another embodiment, the triamine may be represented by Formula 1.

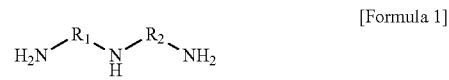

[Formula 1]

(In Formula 1, wherein $R_1$ and $R_2$ are each independently a $C_1$ to $C_{15}$ alkylene group, a $C_2$ to $C_{15}$ branched alkylene group, or a $C_3$ to $C_{15}$ cycloalkylene group).

In a further embodiment, the dicarboxylic acid may include at least one of a $C_8$ to $C_{20}$ aromatic dicarboxylic acid and a $C_3$ to $C_{20}$ aliphatic dicarboxylic acid.

In yet another embodiment, the diamine may include at least one of a $C_6$ to $C_{20}$ aromatic diamine and a $C_2$ to $C_{20}$ aliphatic diamine.

In yet another embodiment, the triamine may be present in an amount of about 1 mol % to about 8 mol % based on 100 mol % of the amine compound.

In yet another embodiment, the dicarboxylic acid and the amine compound may be present in a mole ratio of about 1:0.98 to about 1:1.15.

In yet another embodiment, the polyamide resin may have a difference of about 50° C. or more between melting temperature (Tm) and crystallization temperature (Tc) thereof.

Another aspect of the present invention relates to a polyamide resin composition.

In one embodiment, the polyamide resin composition may include the polyamide resin and about 10 to about 50 parts by weight of a fiber-reinforcing agent relative to 3 parts by weight of the polyamide resin.

In another embodiment, the polyamide resin composition may have a ⅛" notched Izod impact strength of about 8.0 kgf·cm/cm to about 12 kgf·cm/cm, as measured on specimen in accordance with ASTM D256.

In a further embodiment, the polyamide resin composition may have a 1,000-hour tensile strength retention rate of about 80% or more, as measured on a specimen at 170° C. in accordance with ASTM D638.

In yet another embodiment, the polyamide resin composition may further include at least one of a flame retardant, a surfactant, a nucleating agent, a coupling agent, a filler, a plasticizer, an impact modifier, a lubricant, an antibiotic agent, a release agent, a heat stabilizer, an antioxidant, a photostabilizer, a compatibilizer, an inorganic additive, a colorant, a lubricating agent, an antistatic agent, a pigment, a dye, and a flame proofing agent.

A further aspect of the present invention relates to a molded product formed from a polyamide resin composition including the polyamide resin.

Advantageous Effects

The present invention provides a polyamide resin that exhibits high impact resistance and high thermal resistance and provides an extinction effect ideal for use in an exterior material, a polyamide resin composition including the same, a method of preparing the same, and a molded product including the same.

Best Mode

As used herein, the "branch rate" is measured by 600 MHz 1H-NMR (BRUKER Inc.) after dissolving a sample to 5 w/v % in trifluoroacetic acid-d (TFA-d) used as a solvent, and means a quantified value based on a chemical shift and a variation of height at main peak, after addition of a triamine with reference to a standard sample not containing the triamine.

As used herein, "dicarboxylic acid and the like" includes dicarboxylic acid, alkyl esters thereof ($C_1$ to $C_4$ lower alkyl esters, such as monomethyl, monoethyl, dimethyl, diethyl or dibutyl esters), and acid anhydrides thereof, and can form a dicarboxylic acid moiety through reaction with a diamine or cyclic ester.

As used herein, the terms "dicarboxylic acid moiety," "diamine moiety", and "triamine moiety" mean residues remaining after removal of a hydrogen atom or a hydroxyl group from a dicarboxylic acid, a diamine and a triamine upon polymerization of the dicarboxylic acid, the diamine and the triamine, respectively.

A polyamide resin according to the present invention is a polymer of a monomer mixture including a dicarboxylic acid and an amine compound, wherein the amine compound includes a diamine and a triamine.

Dicarboxylic Acid

The dicarboxylic acid may include at least one of a $C_8$ to $C_{20}$ aromatic dicarboxylic acid and a $C_3$ to $C_{20}$ aliphatic dicarboxylic acid.

Examples of the aromatic dicarboxylic acid may include terephthalic acid, isophthalic acid, 2,6-naphthalene dicarboxylic acid, 2,7-naphthalene dicarboxylic acid, 1,4-naphthalene dicarboxylic acid, 1,4-phenylenedioxy diacetic acid, 1,3-phenylenedioxy diacetic acid, diphenic acid, 4,4'-oxydibenzoic acid, diphenylmethane-4,4'-dicarboxylic acid, diphenylsulfone-4,4'-dicarboxylic acid, 4,4'-biphenyl dicarboxylic acid and mixtures thereof, without being limited thereto.

Examples of the aliphatic dicarboxylic acid may include aliphatic dicarboxylic acids, such as malonic acid, dimethyl malonic acid, succinic acid, glutaric acid, adipic acid, 2-methyladipic acid, trimethyladipic acid, pimaric acid, 2,2-dimethylglutaric acid, 3,3-diethylsuccinc acid, suberic acid, azelaic acid, sebacic acid, undecanedioic acid, dodecanedioic acid, and alicyclic dicarboxylic acids, such as 1,4-cyclohexane dicarboxylic acid and 1,3-cyclopenthane dicarboxylic acid, without being limited thereto.

In some embodiments, a mixture including at least one of these dicarboxylic acids may be used.

Specifically, the aromatic dicarboxylic acid may be present in an amount of about 0 to about 75 mol %, more specifically about 0 to about 65 mol %, based on 100 mol % of the dicarboxylic acid. Within this range, the polyamide resin can exhibit good properties in terms of thermal resistance and crystallinity. In addition, the aliphatic dicarboxylic acid may be present in an amount of about 25 mol % to about 100 mol %, specifically about 35 mol % to about 100 mol %, based on 100 mol % of the dicarboxylic acid. Within this range, it is possible to obtain a polyamide resin that exhibits further improved processability without deterioration in other properties. For example, the aromatic dicarboxylic acid may be terephthalic acid and/or the aliphatic dicarboxylic acid may be adipic acid.

Amine Compound

In some embodiments, the amine compound includes a diamine and a triamine.

The diamine may include at least one of a $C_6$ to $C_{20}$ aromatic diamine and a $C_2$ to $C_{20}$ aliphatic diamine.

Examples of the $C_6$ to $C_{20}$ aromatic diamine may include m-xylene diamine, o-xylene diamine, p-xylene diamine, p-phenylene diamine, m-phenylene diamine, 4,4'-diaminodiphenylsulfone, and 4,4'-diaminodiphenylether, without being limited thereto.

Examples of the $C_2$ to $C_{20}$ aliphatic diamine may include aliphatic alkylene diamines, such as ethylene diamine, propanediamine, 1,4-butanediamine, 1,6-hexanediamine (hexamethylene diamine), 1,7-heptanediamine, 1,8-octanediamine, 1,9-nonanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, 5-methyl-1,9-nonanediamine, and alicyclic diamines, such as cyclohexanediamine, methylcyclohexanediamine, isophoronediamine, bis(4-aminocyclohexyl)methane, 1,3-bisaminomethylcyclohexane, 1,4-bisaminomethylcyclohexane, norbornenedimethaneamine, and tricyclodecanedimethaneamine, without being limited thereto.

In some embodiment, the dicarboxylic acid and the amine compound may be present in a mole ratio of about 1:0.98 to about 1:1.15, specifically about 1:0.98 to about 1:1.10. Within this range, the polyamide resin can prevent deterioration in properties thereof due to unreacted monomers.

The triamine may be represented by Formula 1.

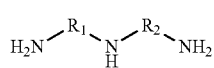

[Formula 1]

(In Formula 1, wherein $R_1$ and $R_2$ are each independently a $C_1$ to $C_{15}$ alkylene group, a $C_2$ to $C_{15}$ branched alkylene group, or a $C_3$ to $C_{15}$ cycloalkylene group).

The triamine of the polyamide resin allows formation of a gel and/or a branch chain during polymerization, thereby providing a branched polyamide (PA). In some embodiments, the polyamide resin may have a branch rate of about 1%, 2%, 3%, 4%, 5%, 6%, 7%, or 8%, as measured by 1H-NMR. In addition, the polyamide resin may have a branch rate ranging from one of the numerical values set forth above to another numerical value set forth above, as measured by 1H-NMR. For example, the polyamide resin may have a branch rate of about 1% to about 8%, specifically about 1% to about 6%, more specifically about 1% to about 5%, as measured by 1H-NMR. Within this range, the polyamide resin can exhibit good properties in terms of long-term thermal resistance and tensile strength retention rate while providing an impact reinforcement effect due to branch chains and the like. Furthermore, the polyamide resin can prevent deterioration in long-term thermal resistance through use of no impact modifier or a minimum amount of an existing impact modifier.

The branch rate of the polyamide resin can be controlled by adjusting the amount of the triamine during polymerization. For example, the triamine may be present in an amount of about 1 mol %, 2 mol %, 3 mol %, 4 mol %, 5 mol %, 6 mol %, 7 mol %, or 8 mol %, based on 100 mol % of the amine compound. In addition, the triamine may be present in an amount ranging from one of the numerical values set forth above to another numerical value set forth above, based on 100 mol % of the amine compound. For example, the triamine may be present in an amount of about 1 mol % to about 8 mol %, specifically about 1 mol % to about 6 mol %, more specifically about 1 mol % to about 5 mol %, based on 100 mol % of the amine compound. Within this range, the polyamide resin can have balance between impact strength and tensile strength retention rate.

Specifically, the triamine may be represented by

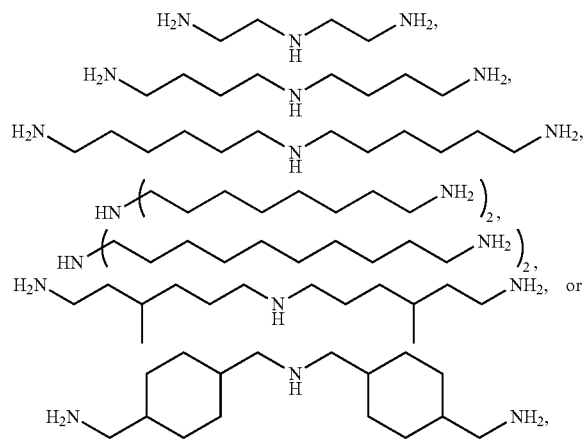

more specifically

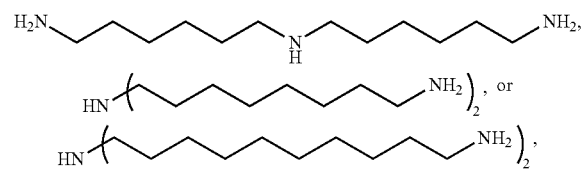

without being limited thereto.

Polymerization may be performed by a typical polymerization method, for example, melt polymerization.

Polymerization may be performed at a temperature of about 80° C. to about 280° C., for example, about 90° C. to about 270° C., and at a pressure of about 10 kgf/cm² to about 40 kgf/cm², without being limited thereto.

In some embodiments, the polyamide resin may be prepared by preparing a prepolymer through polymerization of the monomer mixture, followed by solid state polymerization of the prepolymer. For example, in a reactor, the monomer mixture, a catalyst and water are placed and stirred at about 80° C. to about 150° C. for about 0.5 to about 2 hours to form a mixture, which in turn is left at about 200° C. to about 220° C. under a pressure of about 10 kgf/cm² to about 40 kgf/cm² for about 1 to about 4 hours, followed by reaction (copolymerization) at a pressure of about 0 kgf/cm² to about 30 kgf/cm² for about 1 to about 3 hours, thereby preparing a polyamide prepolymer. Then, the prepolymer is subjected to solid state polymerization(SSP) at a temperature between the glass transition temperature Tg and the melting temperature Tm thereof in a vacuum for about 2 to about 20 hours, thereby preparing a polyamide resin.

The prepolymer may have an inherent viscosity [η] of about 0.1 dL/g to about 0.4 dL/g, for example, about 0.1 dL/g to about 0.3 dL/g, as measured at 25° C. using an Ubbelohde viscometer after being dissolved in a 98% sulfuric acid solution, without being limited thereto. Within this range, the prepolymer can be easily discharged from the reactor.

In some embodiments, solid state polymerization may be performed by heating the prepolymer to about 150° C. to about 300° C., for example, to about 180° C. to about 260° C., in a vacuum or in the presence of an inert gas such as nitrogen, argon, and the like. Under these conditions, a polyamide resin having a weight average molecular weight of about 5,000 g/mol to about 50,000 g/mol can be obtained.

For copolymerization, a catalyst may be used. The catalyst may be a phosphorous-based catalyst. For example, the catalyst may include phosphoric acid, phosphorous acid, hypophosphorous acid, salts thereof, or derivatives thereof. More specifically, the catalyst may include phosphoric acid, phosphorous acid, hypophosphorous acid, sodium hypophosphite, sodium hypophosphonate, and the like. The catalyst may be present in an amount of, for example, about 3 parts by weight or less, for example, about 0.001 to about 1 part by weight, specifically about 0.01 to about 0.5 parts by weight, relative to 100 parts by weight of the monomer mixture, without being limited thereto.

In preparation of the polyamide resin, an end-capping agent may be used in order to adjust the viscosity of the polyamide resin. The end-capping agent may include at least one of an aliphatic carboxylic acid and an aromatic carboxylic acid. For example, the end-capping agent may include at least of acetic acid, propionic acid, butyric acid, valeric acid, caproic acid, caprylic acid, lauric acid, tridecanoic acid, myristic acid, palmitic acid, stearic acid, pivalic acid, isobutyric acid, benzoic acid, toluic acid, α-naphthalene carboxylic acid, β-naphthalene carboxylic acid, methyl naphthalene carboxylic acid, and mixtures thereof, without being limited thereto.

The end-capping agent may be present in an amount of about 0.01 to about 5 parts by moles, for example, about 0.1 to about 3 parts by moles, relative to 100 parts by moles of the dicarboxylic acid and the diamine, without being limited thereto. Within this range, the end-capping agent can facilitate adjustment of the molecular weight of the copolymerized polyamide resin.

The polyamide resin may have an inherent viscosity [η] of about 0.6 dL/g to about 4 dL/g, specifically about 1 dL/g to about 4 dL/g, more specifically about 1.2 dL/g to about 3 dL/g, as measured at 25° C. using an Ubbelohde viscometer after being dissolved to about 0.5 g/dL in a 98% sulfuric acid solution, without being limited thereto. Within this range, the polyamide resin can exhibit good properties in terms of impact resistance and thermal resistance.

The polyamide resin may have a melting temperature (Tm) of about 200° C. to about 320° C., specifically about 210° C. to about 310° C., more specifically about 220° C. to about 300° C., and a crystallization temperature (Tc) of about 130° C. to about 280° C., specifically about 150° C. to about 275° C. Within these ranges, the copolymerized polyamide resin can secure good moldability upon manufacture of a molded product requiring good properties in terms of thermal resistance and high appearance characteristics.

The polyamide resin may have a difference of about 50° C. or more between the melting temperature (Tm) and the crystallization temperature (Tc) thereof, for example, about 50° C. to about 70° C., specifically about 55° C. to about 65° C. Within this range, the polyamide resin can prevent excessive increase in crystallization temperature and thus does not suffer from deterioration in exterior appearance such as protrusion of inorganic materials.

The polyamide resin may have a glass transition temperature (Tg) of about 90° C. to about 110° C., for example, about 92° C. to about 105° C. Within this range, the copolymerized polyamide resin can exhibit good thermal resistance.

In some embodiments, the polyamide resin may have a weight average molecular weight of about 5,000 g/mol to about 100,000 g/mol and a number average molecular weight of about 1,000 g/mol to about 25,000 g/mol, as measured by gel permeation chromatography (GPC), without being limited thereto. In addition, the polyamide resin may have a GPC polydispersity index (PDI) of about 3.0 to about 7.0, specifically about 3.0 to about 6.0. Within this range, the polyamide resin has high strength.

Polyamide Resin Composition

The polyamide resin composition may include the polyamide resin (hereinafter, first polyamide resin) according to the embodiments of the invention and a fiber-reinforcing agent.

In the polyamide resin composition, the first polyamide resin provides not only good properties in terms of impact resistance and thermal resistance, but also an extinction effect. In the polyamide resin composition, the first polyamide resin may be present in an amount of about 0.1 wt % to about 10 wt %, specifically about 0.1 wt % to about 5 wt %. Within this range, the polyamide resin composition can have balance between impact resistance and extinction effect.

The fiber-reinforcing agent may be glass fibers formed of glass filaments coated with a sizing agent such as epoxy, urethane, silane, and the like. The glass filaments may have an average diameter of about 5 μm to about 20 μm and the glass fiber-reinforcing agent may have an average diameter of about 10 μm to about 13 μm, without being limited thereto. The sizing agent may be present in an amount of about 0.05 to about 0.1 parts by weight relative to 100 parts by weight of the glass filaments, without being limited thereto.

The polyamide resin composition may include the fiber-reinforcing agent in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 parts by weight, relative to 3 parts by weight of the polyamide resin (first polyamide resin) according to the embodiments of the invention. In addition, the polyamide resin composition may include the fiber-reinforcing agent in an amount ranging from one of the numerical values set forth above to another numerical value set forth above, relative to 3 parts by weight of the polyamide resin (first polyamide resin) according to the embodiments of the invention. For example, the polyamide resin composition may include the fiber-reinforcing agent in an amount of about 10 parts by weight to about 50 parts by weight, specifically about 10 parts by weight to about 40 parts by weight, relative to 3 parts by weight of the polyamide resin (first polyamide resin) according to the embodiments of the invention. Within this range, the polyamide resin composition can have balance between impact resistance, extinction effect and processability.

In the polyamide resin composition, the fiber-reinforcing agent may be present in an amount of about 10 wt % to about 50 wt %, specifically about 10 wt % to about 40 wt %. Within this range, the polyamide resin composition can exhibit good properties, external appearance and processability. The polyamide resin composition may further include a heat stabilizer.

The polyamide resin composition may further include a second polyamide resin composition. The second polyamide resin is substantially the same as the first polyamide resin except that the second polyamide resin does not include a triamine in the amine compound. In the polyamide resin composition, the second polyamide resin may be present in an amount of about 40 wt % to about 90 wt %, specifically about 45 wt % to about 85 wt %, more specifically about 50 wt % to about 80 wt %. Within this range, the polyamide resin composition can have balance between impact resistance and extinction effect.

The polyamide resin composition may further include a heat stabilizer. The heat stabilizer serves to suppress or prevent thermal decomposition of the composition upon mixing or molding of the polyamide resin composition at high temperature. The heat stabilizer may include, for example, phosphite, phenol, tin malate or aluminosilicate heat stabilizers, without being limited thereto.

In the polyamide resin composition, the heat stabilizer may be present in an amount of about 0.01 wt % to about 1 wt %, specifically about 0.1 wt % to about 0.5 wt %. Within this range, the polyamide resin composition can exhibit good thermal stability while generating a small amount of gas.

In some embodiments, the polyamide resin composition may further include at least one additive selected from the group consisting of flame retardants, surfactants, nucleating agents, coupling agents, fillers, plasticizers, impact modifiers, lubricants, antibiotic agents, release agents, heat stabilizers, antioxidants, photostabilizers, compatibilizers, inorganic adds, a colorant, lubricating agents, antistatic agents, pigments, dyes, and flame proofing agents.

The polyamide resin composition may have a notched Izod impact strength of about 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9 or 12.0 kgf·cm/cm, as measured on a ⅛" thick specimen in accordance with ASTM D256. In addition, the polyamide resin composition may have a ⅛" notched Izod impact strength ranging from one of the numerical values set forth above to another numerical value set forth above, as measured on a specimen in accordance with ASTM D256. For example, the polyamide resin composition may have a notched Izod impact strength of about 8.0 kgf·cm/cm to about 12 kgf·cm/cm, specifically about 8.0 kgf·cm/cm to about 11 kgf·cm/cm, as measured on a ⅛" thick specimen in accordance with ASTM D256. Within this range, the polyamide resin composition can exhibit good mechanical properties and be advantageously applied to machineries.

In other embodiments, the polyamide resin composition may have a 1,000-hour tensile strength retention rate of about 80% or more, specifically about 80%, 81%, 82%, 83%, 84% or 85%, as measured on a specimen at 170° C. in accordance with ASTM D638. In addition, the polyamide resin composition may have a 1,000-hour tensile strength retention rate ranging from one of the numerical values set forth above to another numerical value set forth above, as measured on a specimen at 170° C. in accordance with ASTM D638. For example, the polyamide resin composition may have a 1,000-hour tensile strength retention rate of about 80% to about 85%, more specifically about 80% to about 84%, as measured on a specimen at 170° C. in accordance with ASTM D638. Within this range, the polyamide resin composition can be applied to an apparatus designed to operate for a long time.

A molded product according to one embodiment of the invention is formed using a polyamide resin composition including the copolymerized the polyamide resin. For example, the molded product may be applied to packaging films, barrier bottles, casings for electric/electronic products, exterior materials for automobiles, and the like, which require thermal resistance, melt processability, discoloration resistance, and the like, without being limited thereto. The molded product can be easily formed by those skilled in the art.

Mode for Invention

Hereinafter, the present invention will be described in more detail with reference to some examples. It should be understood that these examples are provided for illustration only and are not to be construed in any way as limiting the present invention.

Descriptions of details apparent to those skilled in the art will be omitted for clarity.

EXAMPLES

Preparation of Polyamide Resin
(A) Dicarboxylic Acid
(a1) Adipic acid: Adipic acid produced by Aldrich was used.
(a2) Terephthalic acid: Terephthalic acid produced by Aldrich was used.
(B) Diamine
(b1) m-xylene diamine: m-xylene diamine produced by TCI Co., Ltd. was used.
(b2) 1,6-hexamethylenediamine: 1,6-hexamethylenediamine produced by Aldrich was used.
(C) Triamine
Bis(hexamethylene)triamine (BHMT): BHMT produced by Aldrich was used.

Example 1

A monomer mixture comprising 0.300 moles (43.8 g) of adipic acid as a dicarboxylic acid, 0.300 moles (40.9 g) of m-xylene diamine as a diamine and 0.003 moles (0.7 g) of bis-hexamethylene triamine (BHMT) as a triamine, 0.006 moles (0.4 g) of acetic acid as an end-capping agent, 0.1 g of sodium hypophosphate as a catalyst, and 29 ml of distilled water were placed in a 1 L autoclave, which in turn was charged with nitrogen gas. After the components were stirred at 130° C. for 60 minutes and the temperature was raised to 210° C. for 1 hour, reaction was performed for 1 hour under a maintaining pressure of 13 kgf/cm² and the resulting material was separated into water and a prepolymer through flash(leaching). The separated polyamide prepolymer (inherent viscosity [η]=0.25 dL/g) was put into a tumbler-shaped reactor, followed by solid state polymerization at 190° C. for 5 hours. Thereafter, the resulting material was slowly cooled to room temperature, thereby obtaining a copolymerized polyamide resin (hereinafter, a-1 resin).

Example 2

A polyamide resin (hereinafter, a-2 resin) was prepared in the same manner as in Example 1 except that 0.288 moles (39.2 g) of m-xylene diamine was used as the diamine and 0.015 moles (3.2 g) of bis-hexamethylene triamine (BHMT) was used as the triamine.

Example 3

A polyamide resin (hereinafter, a-3 resin) was prepared in the same manner as in Example 1 except that 0.135 moles (19.7 g) of adipic acid and 0.165 moles (27.4 g) of terephthalic acid were used as the dicarboxylic acid and 0.300 moles (34.9 g) of 1,6-hexamethylenediamine) was used as the diamine.

Example 4

A polyamide resin (hereinafter, a-4 resin) was prepared in the same manner as in Example 3 except that 0.288 moles (33.5 g) of 1,6-hexamethylenediamine was used as the diamine and 0.015 moles (3.3 g) of bis-hexamethylene triamine (BHMT) was used as the triamine.

Comparative Example 1

A polyamide resin (hereinafter, b-1 resin) was prepared in the same manner as in Example 1 except that 0.303 moles (41.3 g) of m-xylene diamine was used as the diamine and the triamine was not used.

Comparative Example 2

A polyamide resin (hereinafter, b-2 resin) was prepared in the same manner as in Example 1 except that 0.301 moles (41.1 g) of m-xylene diamine was used as the diamine and 0.0015 moles (0.3 g) of bis-hexamethylene triamine (BHMT) was used as the triamine.

Comparative Example 3

A polyamide resin (hereinafter, b-3 resin) was prepared in the same manner as in Example 3 except that 0.303 moles (35.2 g) of 1,6-hexamethylenediamine was used as the diamine and the triamine was not used.

Comparative Example 4

A polyamide resin (hereinafter, b-4 resin) was prepared in the same manner as in Example 3 except that 0.301 moles (35.0 g) of 1,6-hexamethylenediamine was used as the diamine and 0.0015 moles (0.3 g) of bis-hexamethylene triamine (BHMT) was used as the triamine.

Comparative Example 5

A polyamide resin (hereinafter, b-5 resin) was prepared in the same manner as in Example 3 except that 0.273 moles (31.7 g) of 1,6-hexamethylenediamine was used as the diamine and 0.030 moles (6.5 g) of bis-hexamethylene triamine (BHMT) was used as the triamine.

Mol % of each component used as the dicarboxylic acid (A) and the amine compounds ((B), (C)) in Examples 1 to 4 and Comparative Examples 1 to 5, the mole ratio of the amine compound to the dicarboxylic acid (amine compound mole)/(dicarboxylic acid mole), and the melting temperature (° C.), glass transition temperature (° C.), inherent viscosity (dL/g) and GPC PDI (gel permeation chromatography polydispersity index) of the polyamide resin are shown in Table 1.

TABLE 1

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| (A) | (a1) | 100 | 100 | 45 | 45 | 100 | 100 | 45 | 45 | 45 |
|  | (a2) | — | — | 55 | 55 | — | — | 55 | 55 | 55 |
| Amine compound (B) | (b1) | 99 | 95 | — | — | 100 | 99.5 | — | — | — |
|  | (b2) | — | — | 99 | 95 | — | — | 100 | 99.5 | 90 |
| (C) |  | 1.0 | 5.0 | 1.0 | 5.0 | — | 0.5 | — | 0.5 | 10 |
| Mole ratio of amine compound to dicarboxylic acid |  | 1.01 | 1.01 | 1.01 | 1.01 | 1.01 | 1.01 | 1.01 | 1.01 | 1.01 |
| Melting temperature (° C.) |  | 220 | 210 | 300 | 298 | 230 | 225 | 307 | 302 | 295 |
| Glass transition temperature (° C.) |  | 92 | 95 | 94 | 95 | 88 | 90 | 91 | 92 | 96 |
| Inherent viscosity (dL/g) |  | 1.5 | 2.0 | 1.6 | 2.5 | 0.85 | 1.0 | 0.90 | 1.1 | Gel |
| GPC PDI (Mw/Mn) |  | 3.5 | 5.0 | 4.8 | 5.5 | 2.2 | 2.5 | 3.0 | 4.5 | — |
| Branch rate (%) |  | 1.2 | 5.2 | 1.0 | 4.9 | 0.1 | 0.6 | 0.2 | 0.5 | 14 |

Polyamide Resin Composition

Examples 5 to 8 and Comparative Examples 6 to 11

Each polyamide resin composition was prepared by mixing the following first polyamide resin, the following second polyamide resin, the following heat stabilizer, the following fiber-reinforcing agent, and the following impact modifier in amounts (parts by weight) as listed in Table 2, followed by extrusion using a twin-axis extruder (L/D=37:1) at 260° C. for Examples 5 to 6, Comparative Examples 6 to 7 and Comparative Example 11, and at 310° C. for Examples 7 and 8 and Comparative Examples 8 to 10.

First polyamide resin: Each of the polyamide resins prepared in Examples 1 to 4 and Comparative Examples 1 to 5 was used in amounts as listed in Table 2.

Second polyamide resin: The polyamide resin prepared in Comparative Example 1 was applied to Examples 5 and 6, Comparative Examples 6 and 7, and Comparative Example 11, and the polyamide resin prepared in Comparative Example 3 was applied to Examples 7 to 8 and Comparative Examples 8 to 10.

(D) Heat stabilizer: Bis(2,6-di-tert-butyl-4-methylphenyl) pentaerythritol diphosphite produced by ASAHI DENKA was used.

(E) Fiber-reinforcing agent: EC10 3MM 910 (SAINT-GOBAIN) was used.

(F) Impact modifier: Maleic anhydride grafted ethylene-propylene rubber produced by EXXON was used.

Impact strength (kgf·cm/cm), tensile strength retention rate (%) and surface gloss (at 60°) of each of the polyamide resin compositions prepared in Examples 5 to 8 and Comparative Examples 6 to 11 were measured and results are shown in Table 2.

TABLE 2

|  |  | Example 5 | Example 6 | Example 7 | Example 8 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| First polyamide resin | a-1 | 3 | — | — | — | — | — | — | — | — | — |
|  | a-2 | — | 3 | — | — | — | — | — | — | — | — |
|  | a-3 | — | — | 3 | — | — | — | — | — | — | — |
|  | a-4 | — | — | — | 3 | — | — | — | — | — | — |
|  | b-1 | — | — | — | — | 3 | — | — | — | — | — |
|  | b-2 | — | — | — | — | — | 3 | — | — | — | — |
|  | b-3 | — | — | — | — | — | — | 3 | — | — | — |
|  | b-4 | — | — | — | — | — | — | — | 3 | — | — |
|  | b-5 | — | — | — | — | — | — | — | — | 3 | — |
| Second polyamide resin | b-1 | 66.7 | 66.7 | — | — | 66.7 | 66.7 | — | — | — | 66.7 |
|  | b-3 | — | — | 66.7 | 66.7 | — | — | 66.7 | 66.7 | 66.7 | — |
| (D) |  | 0.3 | 0.3 | 0.3 | 0.3 | 0.3 | 0.3 | 0.3 | 0.3 | 0.3 | 0.3 |
| (E) |  | 30 | 30 | 30 | 30 | 30 | 30 | 30 | 30 | 30 | 30 |
| (F) |  | — | — | — | — | — | — | — | — | — | 3 |
| Impact strength (kgf · cm/cm) |  | 8.0 | 9.0 | 8.2 | 10.2 | 6.8 | 6.9 | 7.5 | 7.8 | 12.9 | 10.1 |
| Tensile strength retention rate (%) |  | 81 | 82 | 82 | 83 | 80 | 78 | 85 | 83 | 84 | 72 |
| Surface gloss (60°) |  | 45 | 25 | 22 | 20 | 58 | 56 | 45 | 40 | 25 | 59 |

(In Table 2, the content is represented in parts by weight.)

In Table 2, it can be seen that the polyamide resin compositions of Examples including the triamine within the range according to the present invention exhibited good properties in terms of impact strength, tensile strength retention rate and extinction effect.

On the contrary, it can be seen that the polyamide resin compositions of Comparative Examples including no triamine or the triamine out of the range according to the present invention exhibited deterioration in properties in terms of impact strength, tensile strength retention rate or extinction effect. Moreover, the polyamide resin composition of Comparative Example 11 comprising the impact modifier instead of the triamine exhibited deterioration in tensile strength retention rate and extinction effect.

Evaluation of Properties (1) Melting temperature (Tm), crystallization temperature (Tc) and glass transition temperature (Tg) (unit: °C.): Each temperature was measured using a different scanning calorimeter (DSC). As the DSC, a Q20 (TA instruments) was used and measurement was performed in a nitrogen atmosphere under conditions of 30° C. to 350° C. at a temperature increase temperature of 10° C./min, and a cooling speed of 10° C./min.

(2) Inherent viscosity (IVO, unit: dL/g): A polyamide resin was dissolved to a concentration of 0.5 g/dL in a 98% sulfuric acid solution and inherent viscosity was measured at 25° C. using an Ubbelohde viscometer.

(3) GPC polydispersity index (PDI): PDI was analyzed using hexafluoroisopropanol under conditions of 1 ml/min and 40° C. in a PMMA standard.

(4) Branch rate: Branch rate was measured by 600 MHz 1H-NMR (BRUKER Inc.) after dissolving a sample to 5 w/v % using trifluoroacetic acid-d (TFA-d) as a solvent. The branch rate was quantified based on a chemical shift and a variation of height at main peak after addition of a triamine with reference to a standard sample not containing the triamine.

(5) Izod impact strength (unit: kgf·cm/cm): Impact strength was measured on a ⅛" thick notched Izod specimen in accordance with ASTM D256.

(6) Tensile strength retention rate (long-term thermal resistance stability, unit: %): Initial tensile strength (unit: kgf/cm$^2$) was measured on a sample prepared by injection molding of each of the resin compositions of Examples 5 to 8 and Comparative Example 5 to 11 to which the glass fibers were added. Injection molding was performed at 260° C. to 330° C. depending upon melting temperature. Thereafter, each sample was left at 170° C. in a constant temperature oven for 1,000 hours and was measured as to tensile strength. Then, the tensile strength retention rate was calculated by comparing the initial tensile strength with the tensile strength after 1,000 hours. A higher retention rate indicates better long-term thermal resistance stability.

(7) Surface gloss (unit: %): Surface gloss was measured at an angle of 60° using a BYK-Gardner gloss meter in accordance with ASTM D523.

Although some embodiments have been described above, it should be understood that the present invention is not limited to these embodiments, and that various modifications, changes, alterations and variations can be made by those skilled in the art without departing from the spirit and scope of the invention. Therefore, it should be understood that the above embodiments are provided for illustration only and are not to be construed in any way as limiting the present invention.

The invention claimed is:

1. A polyamide resin composition comprising:
a polyamide resin which is a polymer of a monomer mixture comprising a dicarboxylic acid and an amine compound comprising a diamine and a triamine, wherein the polyamide resin has a branch rate of about 1% to about 8%, as measured using $^1$H-NMR; and
about 10 to about 50 parts by weight of a fiber-reinforcing agent relative to 3 parts by weight of the polyamide resin,
wherein the polyamide resin composition has a ⅛" notched Izod impact strength of about 8.0 kgf·cm/cm to about 12 kgf·cm/cm, as measured on a specimen in accordance with ASTM D256.

2. The polyamide resin composition according to claim 1, wherein the polyamide resin composition has a 1,000-hour tensile strength retention rate of about 80% or more, as measured on a specimen at 170° C. in accordance with ASTM D638.

3. The polyamide resin composition according to claim 1, further comprising:
a flame retardant, a surfactant, a nucleating agent, a coupling agent, a filler, a plasticizer, an impact modifier, a lubricant, an antibiotic agent, a release agent, a heat stabilizer, an antioxidant, a photostabilizer, a compatibilizer, an inorganic additive, a colorant, a lubricating agent, an antistatic agent, a pigment, a dye, and/or a flame proofing agent.

4. The polyamide resin composition according to claim 1, wherein the triamine is represented by Formula (1):

[Formula 1]

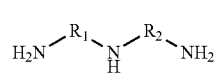

wherein $R_1$ and $R_2$ are each independently a $C_1$ to $C_{15}$ alkylene group, a $C_2$ to $C_{15}$ branched alkylene group, or a $C_3$ to $C_{15}$ cycloalkylene group.

5. The polyamide resin composition according to claim 1, wherein the dicarboxylic acid comprises a $C_8$ to $C_{20}$ aromatic dicarboxylic acid and/or a $C_3$ to $C_{20}$ aliphatic dicarboxylic acid.

6. The polyamide resin composition according to claim 1, wherein the diamine comprises a $C_6$ to $C_{20}$ aromatic diamine and/or a $C_2$ to $C_{20}$ aliphatic diamine.

7. The polyamide resin composition according to claim 1, wherein the triamine is present in an amount of about 1 mol % to about 8 mol % based on 100 mol % of the amine compound.

8. The polyamide resin composition according to claim 1, wherein the dicarboxylic acid and the amine compound are present in a mole ratio of about 1:0.98 to about 1:1.15.

9. The polyamide resin composition according to claim 1, wherein the polyamide resin has a difference of about 50° C. or more between melting temperature (Tm) and crystallization temperature (Tc) thereof.

10. A molded product formed from a polyamide resin composition comprising:
a polyamide resin which is a polymer of a monomer mixture comprising a dicarboxylic acid and an amine compound comprising a diamine and a triamine, wherein the polyamide resin has a branch rate of about 1% to about 8%, as measured using $^1$H-NMR; and
about 10 to about 50 parts by weight of a fiber-reinforcing agent relative to 3 parts by weight of the polyamide resin,
wherein the polyamide resin composition has a ⅛" notched Izod impact strength of about 8.0 kgf·cm/cm to about 12 kgf·cm/cm, as measured on a specimen in accordance with ASTM D256.

* * * * *